US010221720B2

(12) United States Patent
Nolcheff

(10) Patent No.: US 10,221,720 B2
(45) Date of Patent: Mar. 5, 2019

(54) STRUCTURAL FRAME INTEGRATED WITH VARIABLE-VECTORING FLOW CONTROL FOR USE IN TURBINE SYSTEMS

(71) Applicant: HONEYWELL INTERNATIONAL INC., Morristown, NJ (US)

(72) Inventor: Nick Nolcheff, Chandler, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 426 days.

(21) Appl. No.: 14/475,629

(22) Filed: Sep. 3, 2014

(65) Prior Publication Data
US 2016/0061054 A1 Mar. 3, 2016

(51) Int. Cl.
*F01D 25/16* (2006.01)
*F01D 9/02* (2006.01)
(Continued)

(52) U.S. Cl.
CPC ............. *F01D 25/162* (2013.01); *F01D 9/00* (2013.01); *F01D 9/02* (2013.01); *F01D 9/04* (2013.01);
(Continued)

(58) Field of Classification Search
CPC ..... F01D 9/00; F01D 9/02; F01D 9/04; F01D 9/041; F01D 9/06; F01D 9/065;
(Continued)

(56) References Cited

U.S. PATENT DOCUMENTS

| 4,989,406 A | * | 2/1991 | Vdoviak | ............... F01D 25/162 244/117 A |
| 5,394,688 A | * | 3/1995 | Amos | ..................... F23C 7/006 60/39.23 |

(Continued)

FOREIGN PATENT DOCUMENTS

| EP | 1936116 A2 | 6/2008 |
| EP | 1995171 A2 | 11/2008 |

OTHER PUBLICATIONS

Definition of "airfoil", printed from www.grc.nasa.gov/WWW/K-12/FoilSim/Manual/fsim001n.htm (accessed Sep. 25, 2017).*

(Continued)

*Primary Examiner* — Scott Walthour
(74) *Attorney, Agent, or Firm* — Lorenz & Kopf, LLP

(57) ABSTRACT

The present disclosure provides systems and apparatuses for use in turbine systems that integrate structural frame elements into a variable-vectoring flow control configuration in order to reduce the weight and length of such turbine systems. In one exemplary embodiment, an apparatus for directing a gas flow includes an annular outer structural casing, an annular central hub disposed within the outer structural casing, and a plurality of structural support elements extending radially between the central hub and the outer structural casing. The apparatus further includes a plurality of positionally-fixed, variable-vectoring flow control bodies extending radially between the central hub and the outer structural casing and positioned circumferentially (Continued)

along the central hub between ones of the plurality of structural support elements.

10 Claims, 6 Drawing Sheets

(51) Int. Cl.
| | | |
|---|---|---|
| *F01D 9/06* | (2006.01) | |
| *F02C 7/042* | (2006.01) | |
| *F02C 7/04* | (2006.01) | |
| *F01D 9/04* | (2006.01) | |
| *F02C 9/16* | (2006.01) | |
| *F01D 9/00* | (2006.01) | |
| *F01D 25/24* | (2006.01) | |
| *F23R 3/26* | (2006.01) | |
| *F02K 1/46* | (2006.01) | |
| *F02K 1/00* | (2006.01) | |
| *F02K 1/30* | (2006.01) | |
| *F02K 1/28* | (2006.01) | |
| *F02K 1/38* | (2006.01) | |

(52) U.S. Cl.
CPC .............. *F01D 9/041* (2013.01); *F01D 9/06* (2013.01); *F01D 9/065* (2013.01); *F01D 25/24* (2013.01); *F02C 7/04* (2013.01); *F02C 7/042* (2013.01); *F02C 9/16* (2013.01); *F23R 3/26* (2013.01); *F02K 1/002* (2013.01); *F02K 1/008* (2013.01); *F02K 1/28* (2013.01); *F02K 1/30* (2013.01); *F02K 1/38* (2013.01); *F02K 1/46* (2013.01); *F05D 2240/10* (2013.01); *F05D 2240/12* (2013.01); *F05D 2240/122* (2013.01); *F05D 2270/172* (2013.01); *F05D 2270/173* (2013.01); *F05D 2270/18* (2013.01)

(58) Field of Classification Search
CPC ...... F01D 25/162; F01D 25/24; F01D 25/246; F02C 7/04; F02C 9/16; F02K 1/002; F02K 1/008; F02K 1/28; F02K 1/30; F02K 1/38; F02K 1/46; F05D 2240/10; F05D 2240/12; F05D 2240/122; F05D 2270/172; F05D 2270/173; F05D 2270/18; F23R 3/26
See application file for complete search history.

(56) References Cited

U.S. PATENT DOCUMENTS

| | | |
|---|---|---|
| 6,409,465 B1 | 6/2002 | von Flotow et al. |
| 6,851,264 B2 | 2/2005 | Kirtley et al. |
| 7,128,082 B1 | 10/2006 | Cerretelli et al. |
| 7,628,585 B2 | 12/2009 | Lee et al. |
| 7,736,123 B2 | 6/2010 | Lee et al. |
| 7,766,599 B2 | 8/2010 | Lee et al. |
| 7,870,719 B2 | 1/2011 | Lee et al. |
| 7,988,101 B2 | 8/2011 | Osborne et al. |
| 8,096,756 B2 | 1/2012 | Vo |
| 8,157,528 B1 | 4/2012 | Khozikov et al. |
| 8,197,209 B2 | 6/2012 | Wagner |
| 8,282,337 B2 | 10/2012 | Wadia et al. |
| 8,365,510 B2 | 2/2013 | Lugg |
| 8,382,043 B1 | 2/2013 | Raghu |
| 8,435,001 B2 | 5/2013 | Montgomery et al. |
| 8,591,176 B2 | 11/2013 | Guemmer |
| 8,678,760 B2 | 3/2014 | Clemen |
| 2006/0275110 A1* | 12/2006 | Baralon ............... F01D 9/041 415/191 |
| 2008/0101913 A1* | 5/2008 | Lee ........................ F01D 5/145 415/1 |
| 2008/0145233 A1 | 6/2008 | Lee et al. |
| 2008/0149205 A1 | 6/2008 | Gupta et al. |
| 2009/0016871 A1* | 1/2009 | McCaffrey ............ F01D 5/145 415/115 |
| 2009/0169363 A1 | 7/2009 | Wadia et al. |
| 2010/0005777 A1* | 1/2010 | Marshall ................ F02K 1/09 60/204 |
| 2010/0047055 A1 | 2/2010 | Wadia et al. |
| 2010/0170224 A1 | 7/2010 | Clark et al. |
| 2010/0172747 A1 | 7/2010 | Clark et al. |
| 2010/0187366 A1 | 7/2010 | Gupta et al. |
| 2010/0272566 A1* | 10/2010 | Durocher ............... F01D 9/06 415/208.2 |
| 2010/0284786 A1 | 11/2010 | Wadia et al. |
| 2010/0329838 A1 | 12/2010 | Greenblatt |
| 2011/0030375 A1 | 2/2011 | Bunker |
| 2012/0186261 A1* | 7/2012 | Toprani ................ F01D 9/065 60/772 |
| 2013/0051996 A1* | 2/2013 | Hoeger .................. F01D 9/06 415/185 |
| 2013/0312385 A1 | 11/2013 | Saraswathi et al. |

OTHER PUBLICATIONS

USPTO Office Action for U.S. Appl. No. 13/843,246 dated Feb. 25, 2016.
USPTO Office Action for U.S. Appl. No. 13/843,246 dated Oct. 23, 2015.
USPTO Office Action for U.S. Appl. No. 13/843,246 dated Jun. 28, 2016.
USPTO Office Action for U.S. Appl. No. 15/340,370 dated May 4, 2017.
USPTO Office Action for U.S. Appl. No. 15/340,370 dated Feb. 22, 2018.
EP Examination Report for Application No. 14158678.4 dated Mar. 13, 2018.
USPTO Office Action for U.S. Appl. No. 15/340,370 dated Nov. 1, 2017.
European Search Report for Application No. 14158678.4 dated Feb. 28, 2018.
USPTO Final Office Action for U.S. Appl. No. 15/340,370 dated Aug. 27, 2018.
European Examination Report for Application No. 14158678.4 dated Aug. 27, 2018.

* cited by examiner

STRUCTURAL FRAME INTEGRATED WITH VARIABLE-VECTORING FLOW CONTROL FOR USE IN TURBINE SYSTEMS

TECHNICAL FIELD

Embodiments of the subject matter described herein relate generally to systems and apparatuses for use in turbine systems, such as gas turbine engines, turbochargers, compressors, fan assemblies, generators, auxiliary power units, and the like. More particularly, embodiments of the subject matter relate to such systems and apparatuses that employ a structural frame integrated with variable-vectoring flow control.

BACKGROUND

Gas turbine engines, as well as other turbine systems such as turbochargers, compressors, fan assemblies, generators, auxiliary power units, and the like, typically include a gas compression section feeding a combustion chamber that produces hot gases to drive the turbine stages downstream. The engine compression section typically includes a plurality of moving bladed disks, separated by successive stages of stator vanes that redirect the gas flow.

While some conventional stator vanes are fixed in orientation (that is, they are only capable of redirecting airflow in one direction), other stator vanes known in the prior art are configured as "variable-pitch" vanes: that is, the angular position of a variable-pitch vane about its pivotable radial axis can be selectively adjusted in order to improve compressor performance at different engines speeds and operating conditions. The variable-pitch vanes are oriented using a mechanism known as a variable-pitch actuation and drive mechanism. There are various designs of such mechanisms, but on the whole, they all include one or more actuators fixed to the engine casing, synchronization bars or a control shaft, rings surrounding the engine and positioned transversely with respect to the axis thereof, and substantially axial levers also known as pitch control rods, connecting the rings to each of the variable-pitch vanes. The actuators rotate the rings about the engine axis and these cause all the levers to turn synchronously or asynchronously about the vane pivots. Other variable-pitch mechanisms will be known to those having ordinary skill in the art, particularly as implemented on auxiliary power units (APU).

Additionally present within the engine compression section are one or more structural frame elements that extend radially from the compression section hub to the engine casing to provide structural support in the compression section. For example, a typical compression section frame includes the annular outer structural casing disposed coaxially with the annular inner structural casing, or hub, with a plurality of circumferentially spaced apart struts extending radially therebetween and suitably fixedly joined thereto. The struts are suitably sized to provide a rigid frame for carrying the bearing loads from the hub radially outwardly to the casing.

While these structural frame elements are easily incorporated with fixed-pitch stator vanes, turbine engine compression section configurations with variable-pitch vanes include the radially-extending structural frame elements positioned upstream (with regard to the flow of gas) from the variable-pitch vanes. This configuration adds length and weight to the engine, but is required because of the space necessary to implement the synchronization bars, control shaft, rings, axial levers, and pitch control rods of the variable-pitch mechanism. That is, the space claim and complexity of the variable-pitch mechanism has heretofore effectively excluded the integration of the structural frame elements within (or in the same area as) the variable-pitch mechanism. Additionally, when the vanes are rotated, they require additional space circumferentially both due to the swinging of the vane edges and also the buttons (platforms) that these vanes need to be placed upon (at least at the outer diameter where they are driven). This means they have to be place relatively far away from the struts circumferentially. Since the struts do not move, the airflow out of this "combined" system would be very non-uniform—turning where the variable pitch vanes are and not turning where the struts are. This causes detrimental aerodynamic and mechanical responses from the downstream rotor.

More recent approaches to compression section flow control attempt to achieve the same flow vectoring as the conventional variable-pitch mechanism, but without the need for moving (i.e., rotating, translating) parts, and thus without the need for as much space claim. These more recent approaches typically fall into one of two classes: fluidic flow control approaches and plasma flow control approaches. First, with regard to fluidic flow control approaches, air is injected and/or removed from the flow stream that one desires to influence. Often, the goal is to avoid or eliminate boundary layer "separation," which is a condition where the low velocity fluid near a solid boundary (wall) reverses in direction relative to the bulk of the flow. High velocity air may be injected to "energize" that boundary layer or the boundary layer may be sucked out. In some cases, a slot or series of holes will be used to pulse air in and out locally. Some common fluidic control devices include: steady blowing (continuous, constant injection); unsteady blowing (injection that various at an advantageous frequency); steady and unsteady suction; Coanda jets; and synthetic jets.

Second, with regard to plasma flow control approaches, an electric potential is provided to a device that causes air near the device to ionize. Because of the potential, the device also induces an electric field. The electric field exerts a force on the ionized particles that imparts momentum in a desired direction. As with fluidic control devices, plasma control devices tend to be placed on a solid boundary (wall) in order to influence the boundary layer in a beneficial way. Some common plasma flow control devices include: single dielectric barrier discharge (SDBD); micro- and nano-pulsing plasma actuators; and sliding discharge plasma actuators.

As with the variable-pitch configurations described above, the fluidic control and plasma control configurations known in the prior art have all employed structural frame elements that are located upstream of the flow control elements to avoid any interference with the flow control elements. The prior art lacks any disclosure of attempts to reduce the length and weight of a turbine engine by incorporating structural frame elements into the more recent fluidic control or plasma control configurations that do not require as much space claim as the conventional variable-pitch configurations. Accordingly, it would be desirable to provide improved systems and apparatuses for use in turbine systems that integrate structural frame elements into a variable-vectoring flow control configuration in order to reduce the weight and length of such turbine systems, and in particular the compression section of such turbine systems. Furthermore, other desirable features and characteristics of the systems and apparatuses will become apparent from the subsequent detailed description and the appended claims, taken in conjunction with the accompanying drawings and the preceding background.

BRIEF SUMMARY

The present disclosure provides systems and apparatuses for use in turbine systems that integrate structural frame elements into a variable-vectoring flow control configuration in order to reduce the weight and length of such turbine systems. In one exemplary embodiment, an apparatus for directing a gas flow includes an annular outer structural casing, an annular central hub disposed within the outer structural casing, and a plurality of structural support elements extending radially between the central hub and the outer structural casing. The apparatus further includes a plurality of positionally-fixed, variable-vectoring flow control bodies extending radially between the central hub and the outer structural casing and positioned circumferentially along the central hub between ones of the plurality of structural support elements.

In another exemplary embodiment, a turbine engine system includes a fan section that directs a flow of gas along an axial path into the turbine engine system, a compressor section, axially downstream with respect to the flow of gas from the fan section, that compresses the flow of gas, and a combustion section, axially downstream with respect to the flow of gas from the compressor section, that combusts the flow of gas. The compressor section includes a plurality of structural support elements and a plurality of positionally-fixed, variable-vectoring flow control bodies positioned between ones of the plurality of structural support elements.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures and wherein:

DETAILED DESCRIPTION

Figure 1:
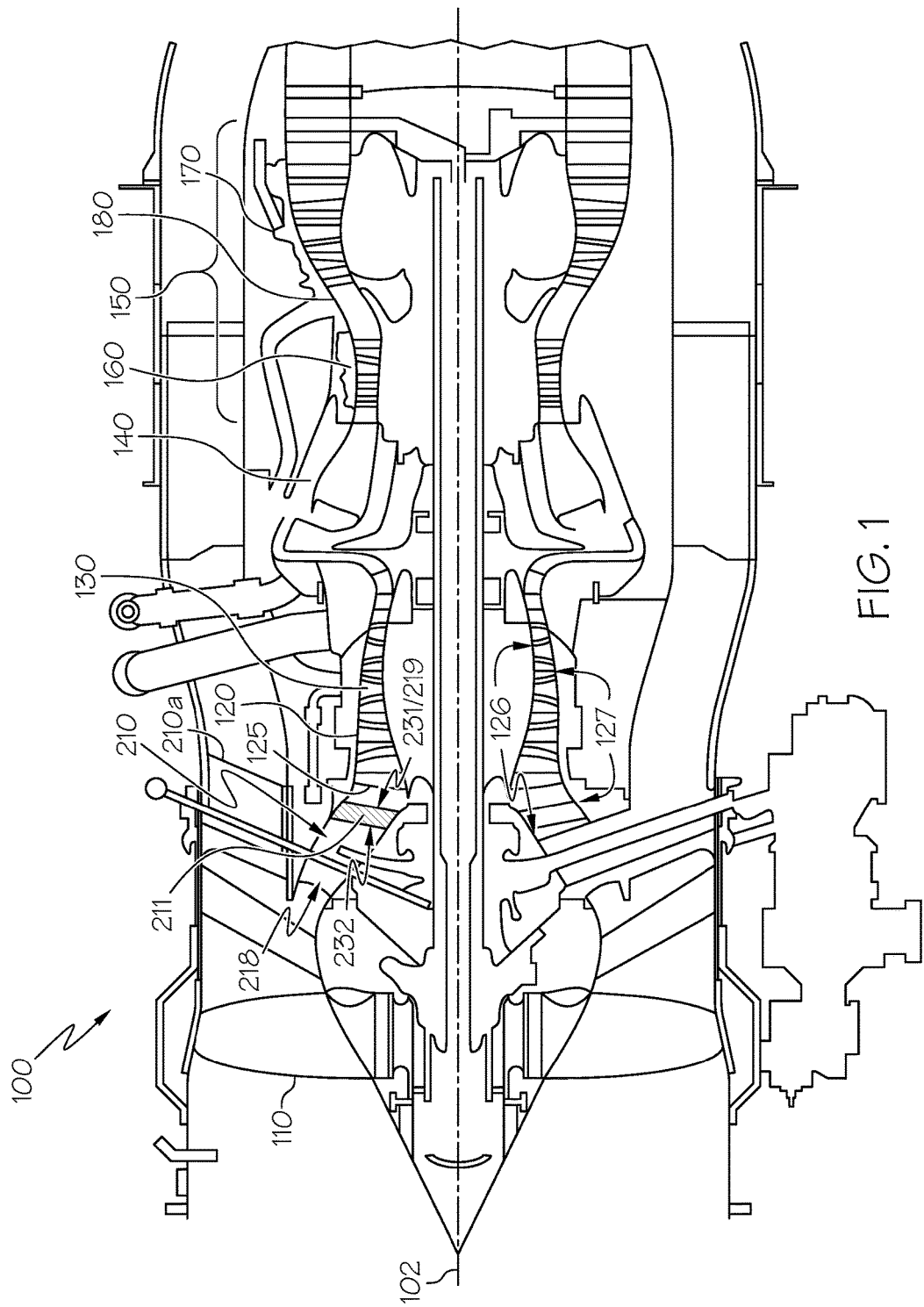
FIG. 1 is a longitudinal-sectional view of an exemplary gas turbine engine including a structural frame integrated with variable-vectoring flow control in the compressor section thereof in accordance with various exemplary embodiments.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Further, as used herein the term "substantially equal" means having a difference in the defined quantity of less than about 10%, such as less than about 5%. Furthermore, there is no intention to be bound by any expressed or implied theory presented in the preceding technical field, background, brief summary or the following detailed description.

The presently described embodiments provide systems and apparatuses for use in turbine systems that integrate structural frame elements into a variable-vectoring flow control configuration in order to reduce the weight and length of such turbine systems. The aforesaid integration is accomplished by providing a plurality of structural struts extending radially from an annular central hub of the compressor section to an annular outer structural casing, along with a plurality of positionally-fixed, variable-vectoring flow control bodies distributed circumferentially about the central hub and between the plurality of structural struts. The structural struts may also incorporate flow control technology. As used herein, the term "positionally-fixed, variable-vectoring flow control body" refers to a body which, like the aforementioned variable-pitch vanes, is capable of directing the flow of gas at variable angles but, unlike the variable-pitch vanes, do not rotate, translate, or otherwise move with respect to the central hub to accomplish such directing of the flow of gas. Examples of positionally-fixed, variable-vectoring flow control bodies include the fluidic control and the plasma control classes approaches as described above, as well as others as are known in the art. Further, the term positionally-fixed, variable-vectoring flow control bodies is intended to also encompass future technologies as may be developed that meet the described criteria. The aforesaid integration is further accomplished by providing a location of maximum thickness (with respect to the circumference of the central hub) of the plurality of structural struts at an axial location that is upstream (with respect to the flow of gas through the compressor section) of a location of maximum thickness (again, with respect to the circumference of the central hub) of the plurality of positionally-fixed, variable-vectoring flow control bodies. Still further, the magnitude of the maximum thickness of the plurality of structural struts is provided so as to be greater than the magnitude of the maximum thickness of the plurality of the positionally-fixed, variable-vectoring flow control bodies. The difference in location and magnitude of the maximum thickness of the structural struts and the positionally-fixed, variable-vectoring flow control bodies reduces the pressure drop experience through the compressor section and results in a more efficient configuration. Other features of the presently described embodiments are provided in greater detail below in connection with the Figures.

FIG. 1 a schematic cross-sectional view of a gas turbine engine 100 in accordance with an exemplary embodiment. Although a gas turbine engine is used in this example, it should be appreciated that the described structural frame elements integrated into a variable-vectoring flow control configuration will find application in a variety of other turbine systems, such as turbochargers, compressors, fan assemblies, generators, auxiliary power units, and the like. As shown in FIG. 1, the engine 100 may be an annular structure about a longitudinal or axial centerline axis 102. In the description that follows, the term "axial" refers broadly to a direction parallel to the axis 102 about which the rotating components of the engine 100 rotate. This axis 102 runs from the front of the engine 100 to the back of the engine 100. The term "radial" refers broadly to a direction that is perpendicular to the axis 102 and that points towards or away from the axis of the engine 100. A "circumferential" direction at a given point is a direction that is normal to the local radial direction and normal to the axial direction. An "upstream" direction refers to the direction from which the local flow is coming, while a "downstream" direction refers to the direction in which the local flow is traveling. In the most general sense, flow through the engine 100 tends to be from front to back (or forward to aft), so the "upstream direction" will generally refer to a forward direction, while a "downstream direction" will refer to a rearward or aft direction. A "chordwise" direction is generally a direction along an airfoil from leading edge to trailing edge along the chordline.

The engine 100 generally includes, in serial flow communication, a fan section 110, a plurality of blades and vanes 120, 125 in a high pressure compressor 130, a combustor 140, and one or more turbines 150, such as a high pressure turbine 160 and a low pressure turbine 170. In other exemplary embodiments, the gas turbine engine could include multiple compressor stages. During operation, ambient air enters the engine 100 at the fan section 110, which directs the air into the compressor and 130. The compressor 130 includes a plurality of blades and vanes, generally indicated by arrows 120, 125, which are disposed radially between an annular central hub 126 and an annular outer structural casing 127. As described in further detail below, in some embodiments, axially-forward portions of the annular central hub 126 (i.e., those portions forward of the compressor 130) may be static (i.e., non-rotating), whereas axially-aft portions of the annular central hub 126 (i.e., those portions in the compressor 130) may rotate. The compressor 130 provides compressed air to the combustor 140 in which the compressed air is mixed with fuel and ignited to generate hot combustion gases. The compressor 130 may also provide cooling air to other portions of the engine 100, such as the cooling arrangements discussed below. The combustion gases from the combustor 140 pass through the high pressure turbine 160 and the low pressure turbine 170 via an inter-turbine duct 180. Although the structural frame of the present disclosure may generally be integrated within any portion of the compressor section 130, in an exemplary embodiment, variable-vectoring flow control is provided in the high pressure compressor 130, and thus the structural frame is integrated at the high pressure compressor 130. Expanded views of the high pressure compressor section 130 that illustrate various exemplary integration schemes is provided in the Figures that follow.

The high pressure turbine 160 and low pressure turbine 170 provide thrust via the expulsion of the exhaust gases, mechanical power by rotating a shaft connected to one of the turbines 160 and 170, or a combination of thrust and mechanical power. In other embodiments, additional or fewer turbines, or different configurations, may be provided.

Figure 2A:
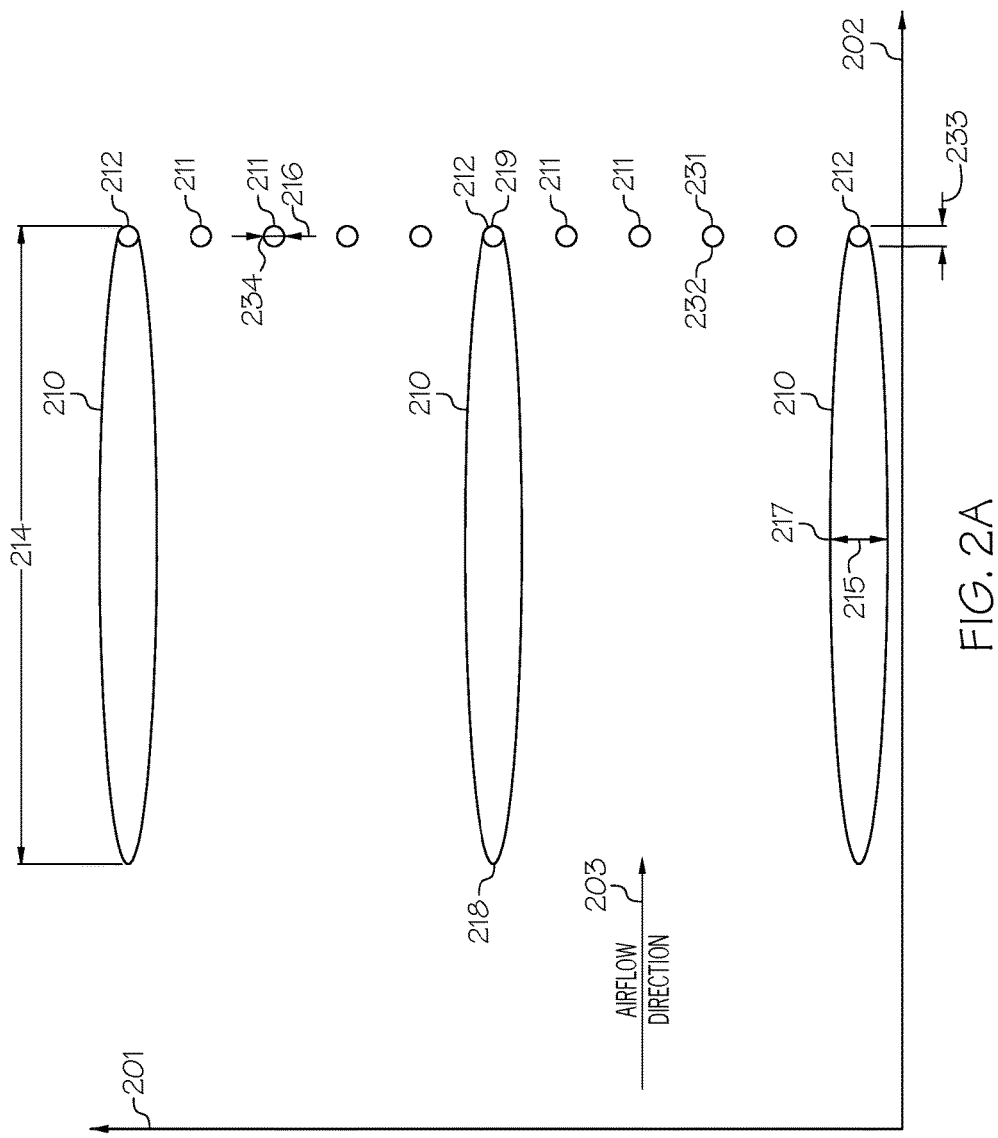
FIGS. 2A and 2B are circumferential and perspective views, respectively, of the high-pressure compressor section of the gas turbine engine of FIG. 1 illustrating the structural frame integrated with variable-vectoring flow control in accordance with one exemplary embodiment of the present disclosure.
Figure 2B:
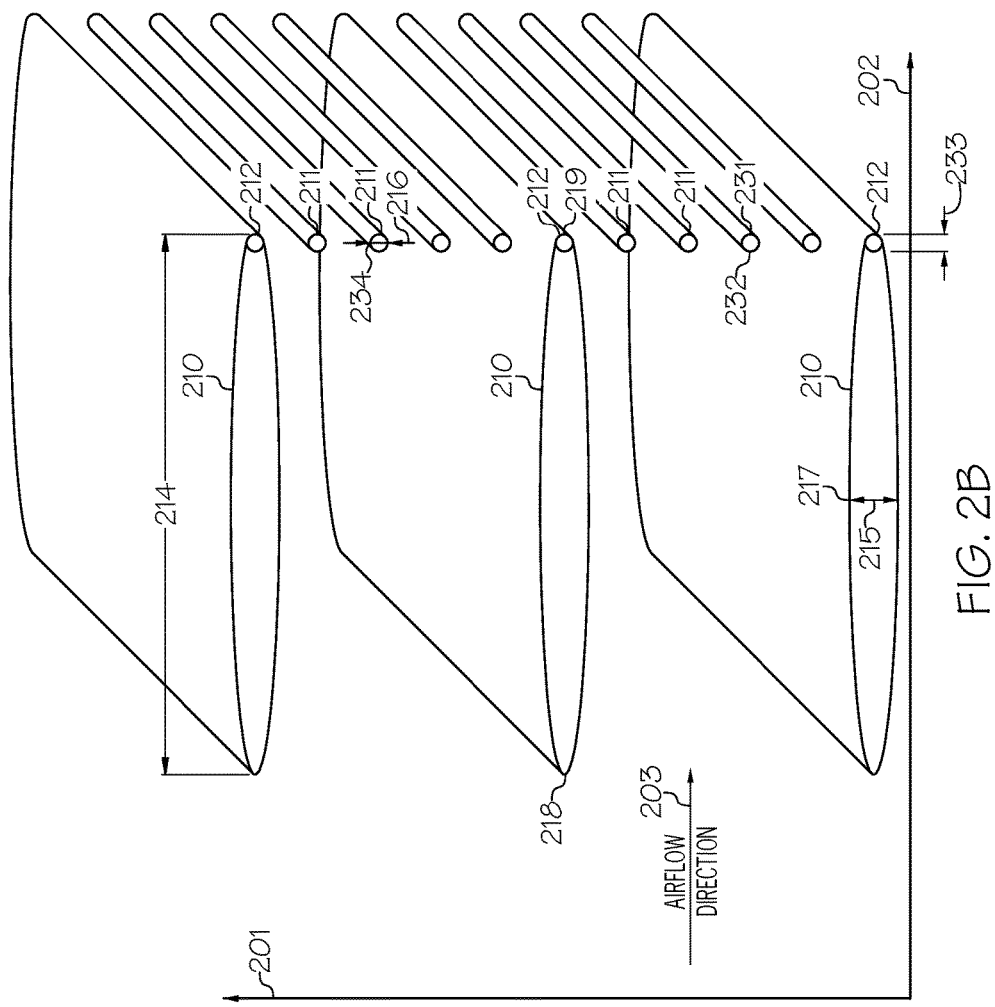

Reference is now additionally made to FIG. 2, which provides a circumferential view of the high-pressure compressor section 130 of the gas turbine engine 100 of FIG. 1 illustrating a structural frame integrated with variable-vectoring flow control in accordance with one exemplary embodiment of the present disclosure. For purposes of reference, axis 201 provided in FIG. 2 illustrates a circumferential direction along the circumference of the central hub 126 (or alternatively along the circumference of the outer structural casing 127). Axis 202 is provided to illustrate the axial or flow direction of engine 100, and is generally oriented parallel to centerline axis 102 shown in FIG. 1. Arrow 203 is parallel to axis 202, and indicates the flow of gas through the compressor section 130.

As illustrated in FIG. 2, the high-pressure compressor section 130 includes a plurality of radially-extending structural support elements or "struts" 210, which are disposed in a fixed configuration between the central hub 126 and the outer structural casing 127 to provide structural support to the compressor of gas turbine engine 100. In some embodiments, the struts 210 may be disposed at the aforementioned axially-forward, non-rotating portion of the central hub 126. In some embodiments, the struts 210 may be of a substantially solid configuration. Although the struts 210 in FIG. 2 are illustrated at a regular spacing, irregularly-spaced configurations are contemplated as well. The total number of struts 210 provided circumferentially about the central hub 126 is dependent on the structural support needs of the gas turbine engine 100, and may generally number from three to ten, or more. The shape of the struts 210 may be generally described as oblong, meaning that the struts are generally rounded at each axial end 218, 219, have an axial length 214 that is substantially greater than their maximum circumferential width 215, and achieve their maximum circumferential width 215 at an axial position 217 that is located between the axial ends 218, 219. In other embodiments, axial ends 218, 219 of struts 210 need not be rounded, but may be squared or any other convenient shape. Further, in rounded embodiments, the degree of rounding (i.e., degree of curvature) may vary, including having different degrees of rounding at each end 218, 219. In some embodiments, the axial length 214 may be from about 3 times to about 20 or more times the circumferential width 215, and is preferably about 5 times to about 15 times. In some embodiments, the position 217 may be achieved anywhere along the axial length 214, for example about 25% along the axial length 214 as measured from upstream end 218, about 50% along such length 214 (substantially as illustrated in FIG. 2), or about 75% along such length, among other positions.

The high-pressure compressor section 130 further includes a plurality of positionally-fixed, variable-vectoring flow control bodies 211, which are disposed in a fixed configuration (as defined above) radially between the central hub 126 and the outer structural casing 127, and circumferentially between ones of the plurality of struts 210, to provide variable-vectoring flow control at different engine speeds within the compressor of gas turbine engine 100. The operational configuration of the flow control bodies 211 will depend substantially on the class thereof employed. For example, plasma flow control bodies will require electrical structures to be included therewith to allow for the generation of plasma as described above. In another example, fluidic flow control bodies will require fluid distribution structure to allow for the injection/removal of air into the boundary layer of gas flow 203 along the bodies. The operational requirements of particular types of positionally-fixed, variable-vectoring flow control bodies 211 are expected to be known to those persons having ordinary skill in the art. Although the flow control bodies 211 in FIG. 2 are illustrated at a regular spacing, irregularly-spaced configurations are contemplated as well. The total number of flow control bodies 211 provided circumferentially about the central hub 126 is dependent on the flow control needs of the gas turbine engine 100, and may generally number from ten, twenty, fifty, one hundred, or more. In between each strut 210, the number of flow control bodies 211 may number from two, five, ten, or more. The shape of the flow control bodies 211 in the embodiment of FIG. 2 may be generally described as circular, meaning that the bodies 211 have a substantially constant diameter and a substantially constant degree of curvature around a circumference thereof, have an axial length 233 that is substantially equal to their maximum circumferential width 216, and achieve their maximum circumferential width 216 at an axial position 234 that is located midway between the axial ends 232, 231. In other embodiments, the flow control bodies need not be generally circular, but may be squared or any other convenient shape (an alternative shape is disclosed in connection with FIG. 3, for example).

In comparison to the size of the struts 210, the flow control bodies 211 may be generally smaller. Particularly, the axial length 233 of the flow control bodies 211 may be less than about 25%, less than about 10%, or less than about 5% of the axial length 214 of the struts 210. Further, the circumferential width 216 of the flow control bodies 211 may be less than about 75%, such as less than about 50% of the circumferential width 215 of the struts 210. In comparison to the position of the point of maximum circumferential width 217 of the struts 210, the point of maximum circumferential width 234 will be located axially (with respect to axis 202) further downstream, as initially noted in this disclosure. Such positioning of the maximum circumferential widths 217, 234, along with the relative smaller circumferential width 216 of the flow control bodies 211, results in a relatively low pressure drop through the compressor section 130 and accordingly a relatively higher efficiency of operation of the compressor section 130.

In some embodiments, as further illustrated in FIG. 2, some of the struts 210 may incorporate a positionally-fixed, variable-vectoring flow control functionality 212, for example generally located at the downstream axial end 219 thereof. The flow control functionality of the struts 210 will be implemented in the same manner as the flow control bodies 211 (for example, electrical current or air injection/removal), but will be confined within the physical bounds of the struts 210. The downstream axial ends 219 of the struts 210 may be conveniently curved or otherwise shaped similarly to the downstream axial ends 231 of the flow control bodies 211 to allow for easier integration of the flow control functionality 212 into the struts 210. Further as shown in FIG. 2 (although this need not be the case in all embodiments) the downstream axial ends 219, 231 of the struts 210 and the flow control bodies 211, respectively, are provided at a substantially equal axial position, in order to allow the flow control functionality 212 of the struts 210 and the flow control bodies 211 to be positioned at a substantially equal axial position within the compressor section 130. In other embodiments, however, they need not be provided at a substantially equal axial position, and could be shifted either forward or backward in the axial direction.

Figure 3A:
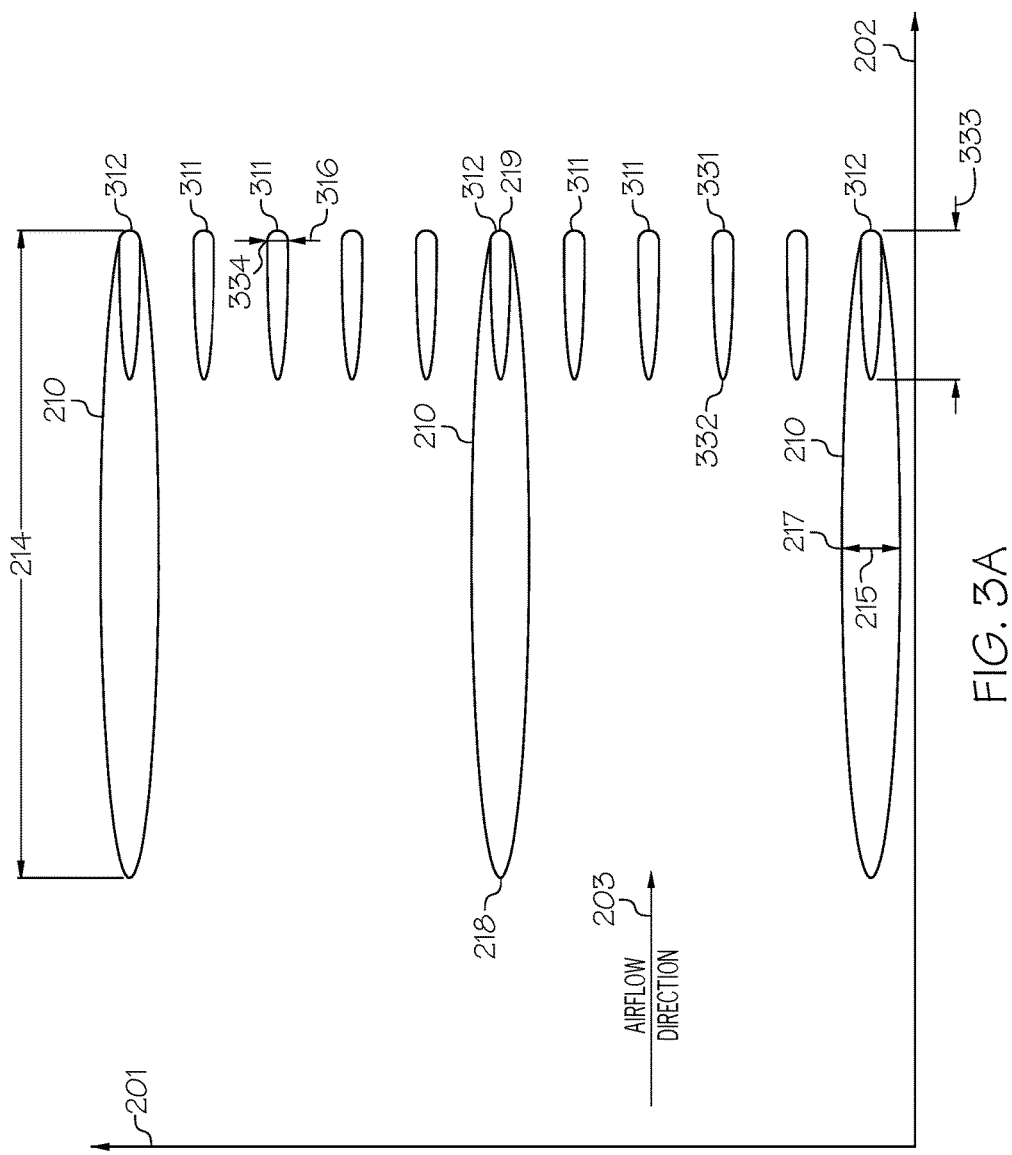
FIGS. 3A and 3B are circumferential and perspective views, respectively, of the high-pressure compressor section of the gas turbine engine of FIG. 1 illustrating the structural frame integrated with variable-vectoring flow control in accordance with another exemplary embodiment of the present disclosure.
Figure 3B:
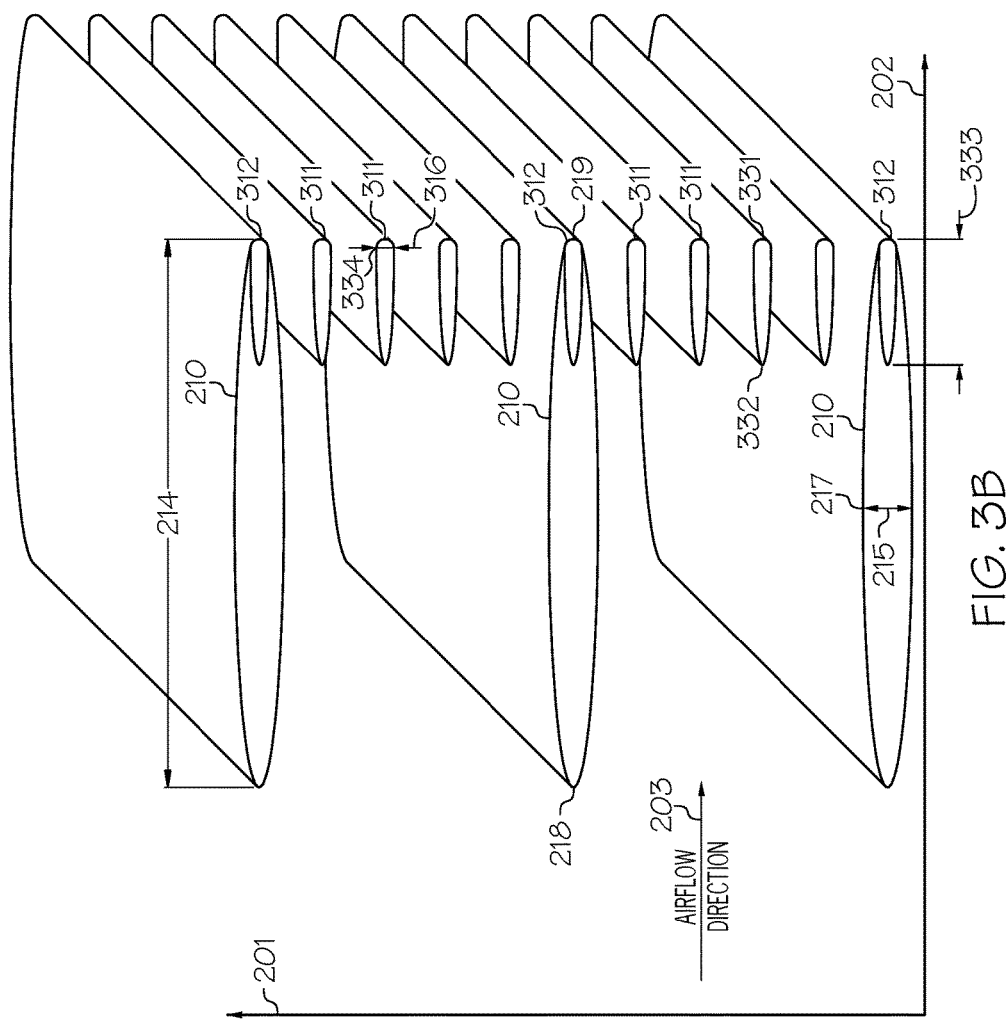

An alternative embodiment of the shape and size of positionally-fixed, variable-vectoring flow control bodies 311 is illustrated in FIG. 3. As shown therein, provided are a plurality of positionally-fixed, variable-vectoring flow control bodies 311, which are disposed in a fixed configuration (as defined above) radially between the central hub 126 and the outer structural casing 127, and circumferentially between ones of the plurality of struts 210, to provide variable-vectoring flow control at different engine speeds within the compressor of gas turbine engine 100. Although the flow control bodies 311 in FIG. 3 are illustrated at a regular spacing, irregularly-spaced configurations are contemplated as well. The total number of flow control bodies 311 provided circumferentially about the central hub 126 is dependent on the flow control needs of the gas turbine engine 100, and may generally number from ten, twenty, fifty, one hundred, or more. In between each strut 210, the number of flow control bodies 311 may number from two, five, ten, or more. The shape of the flow control bodies 311 may be generally described as oblong, meaning that the bodies are generally rounded at each axial end 332, 331, have an axial length 333 that is substantially greater than their maximum circumferential width 316, and achieve their maximum circumferential width 316 at an axial position 334 that is located between the axial ends 332, 331. In other embodiments, axial ends 332, 331 of flow control bodies 311 need not be rounded, but may be squared or any other convenient shape. Further, in rounded embodiments, the degree of rounding (i.e., degree of curvature) may vary, including having different degrees of rounding at each end 332, 331. For example, as shown in FIG. 3, the upstream axial end 332 has a smaller radius of curvature than the downstream axial end 331. In some embodiments, the axial length 333 may be from about 3 times to about 20 or more times the circumferential width 316, and is preferably about 5 times to about 10 times. In some embodiments, the position 316 may be achieved anywhere along the axial length 333, for example about 10% along the axial length 333 as measured from upstream end 218, about 25% along such length 214, about 75% along such length, among other positions, or about 90% along such length (substantially as illustrated in FIG. 3).

In this embodiment, as with the embodiment illustrated in connection with FIG. 2, some of the struts 210 may incorporate a positionally-fixed, variable-vectoring flow control functionality 312, for example generally located at the downstream axial end 219 thereof. The flow control functionality of the struts 210 will be implemented in the same manner as the flow control bodies 311 (for example, electrical current or air injection/removal), but will be confined within the physical bounds of the struts 210. The downstream axial ends 219 of the struts 210 may be conveniently curved or otherwise shaped similarly to the downstream axial ends 331 of the flow control bodies 311 to allow for easier integration of the flow control functionality 312 into the struts 210. Further as shown in FIG. 3 (although this need not be the case in all embodiments) the downstream axial ends 219, 331 of the struts 210 and the flow control bodies 311, respectively, are provided at a substantially equal axial position, in order to allow the flow control functionality 312 of the struts 210 and the flow control bodies 311 to be positioned at a substantially equal axial position within the compressor section 130.

Figure 4:
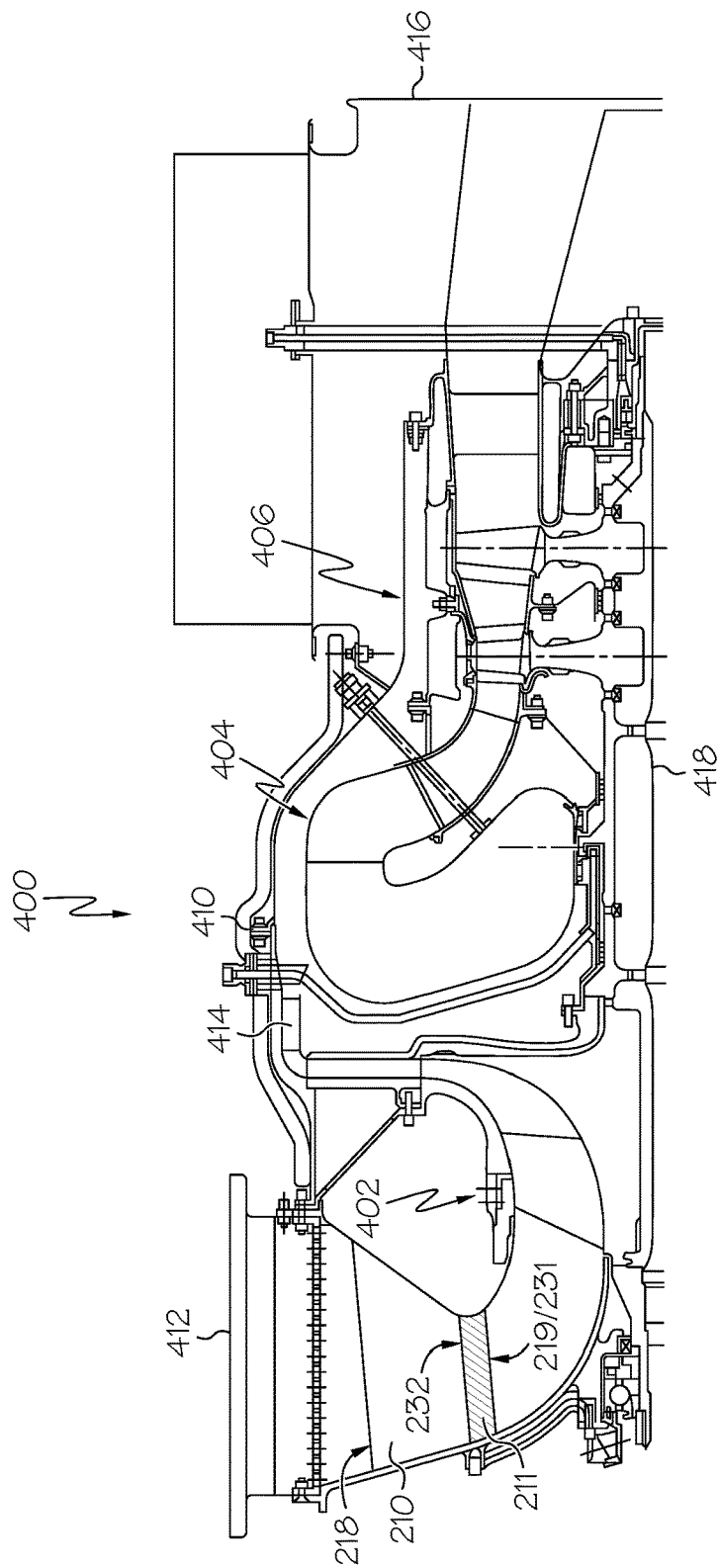
FIG. 4 is a longitudinal-sectional view of an exemplary auxiliary power unit including a structural frame integrated with variable-vectoring flow control in accordance with further exemplary embodiments.

As initially noted, the positionally-fixed, variable-vectoring flow control bodies of the present disclosure will find application in turbine systems beyond the exemplary gas turbine engine 100 that has been previously described. For example, in accordance with a further embodiment, an exemplary auxiliary power unit (APU) 400 is illustrated in FIG. 4 and includes flow control bodies 211 integrated with structural frame struts 210. The APU 400 includes a compressor 402, a combustion system 404, and a turbine 406, all disposed within a case 410. Air is directed into the compressor 402 via an air inlet 412. The compressor 402 raises the pressure of air and supplies compressed air via a compressed air outlet 414. In the depicted embodiment, the compressor 402 is a single-stage, high-pressure ratio compressor. However, it will be appreciated that this is merely exemplary of a preferred embodiment, and that other types of compressors could also be used, such as those having two or more stages.

The compressed air from the compressor 402 is directed into the combustion system 404, where it is mixed with fuel supplied from a fuel source (not shown). In the combustion system 404 the fuel/air mixture is combusted, generating high-energy gas. The high-energy gas is then diluted and supplied to the turbine 406.

With regard to all of the embodiments presented herein, it should be appreciated that although the engine 100 and the APU 400 are shown as including a single compressor stage, the concepts presented in this disclosure could be applied to multiple stage compressor embodiments. For example, with regard to either the gas turbine engine or the APU, if multiple compressor stages are present, the positionally-fixed, variable-vectoring flow control bodies of the present disclosure and the frame support struts could be located before or after any of the stages, including between the stages.

The high-energy, diluted gas from the combustion system 404 expands through the turbine 406, where it gives up much of its energy and causes the turbine 406 to rotate. The gas is then exhausted from the APU 400 via an exhaust gas outlet 416. As the turbine 406 rotates, it drives, via a turbine shaft 418, various types of equipment that may be mounted in, or coupled to, the engine 400. For example, in the depicted embodiment the turbine 406 drives the compressor 402. It will be appreciated that the turbine may also be used to drive a generator and/or a load compressor and/or other rotational equipment, which are not shown in FIG. 4 for ease of illustration.

As shown in FIG. 4, after air passes the inlet 412 and before it reaches compressor 402, it passes by a structural strut 210 and integrated flow control bodies 211. Although flow control bodies 211 are depicted, any configuration (such as flow control bodies 311) as described above could be implemented.

Accordingly, described herein are various exemplary embodiments of systems and apparatuses for use in turbine systems that integrate structural frame elements into a variable-vectoring flow control configuration in order to reduce the weight and length of such turbine systems, and in particular the compression section of such turbine systems. Moreover, the described embodiments beneficially exhibit a reduced pressure drop and increased efficiency of operation of the subject turbine systems, which may enhance system performance and increase operational life expectancy.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An apparatus for directing a compressed air flow comprising:
   an annular outer structural casing; an annular central hub disposed within the annular outer structural casing;
   a plurality of structural support elements extending radially between the annular central hub and the annular outer structural casing; and
   a plurality of positionally-fixed, variable-vectoring flow control bodies extending radially between the annular central hub and the annular outer structural casing and positioned circumferentially along the annular central hub, the plurality of positionally-fixed, variable-vectoring flow control bodies being interposed between the plurality of structural support elements,
   wherein the plurality of positionally-fixed, variable-vectoring flow control bodies comprise either:
   (1) plasma control bodies, wherein the plasma control bodies are configured to provide an electric potential to the compressed air flow to ionize the compressed air flow and to generate an electric field that exerts a force on the ionized compressed air flow, or
   (2) fluidic control bodies, wherein the fluidic control bodies are configured to inject and/or remove air from the compressed air flow,
   wherein two or more of the plurality of positionally-fixed, variable-vectoring flow control bodies are disposed between successive structural support elements of the plurality of structural support elements,
   wherein a maximum circumferential width of each positionally-fixed, variable-vectoring flow control body is less than a maximum circumferential width of each structural support element,
   wherein each structural support element has an oblong configuration and each positionally-fixed, variable-vectoring flow control body has a circular configuration, and
   wherein the plurality of positionally-fixed, variable-vectoring flow control bodies are capable of actively directing the compressed air flow at variable angles but do not rotate, translate, or otherwise move with respect to the annular central hub to accomplish such variable-angle directing of the compressed air flow.

2. The apparatus of claim 1, wherein a location of the maximum circumferential width of each structural support element is positioned axially upstream, with respect to the compressed air flow, from a location of the maximum circumferential width of each positionally-fixed, variable-vectoring flow control body.

3. The apparatus of claim 2, wherein each positionally-fixed, variable-vectoring flow control body has a downstream axial end, with respect to the compressed air flow, that is at a first axial position with respect to the annular central hub, wherein each structural support element has a downstream axial end, with respect to the compressed air flow, that is at a second axial position with respect to the annular central hub, and wherein the first axial position and the second axial position are substantially equal.

4. The apparatus of claim 3, wherein a degree of curvature of the downstream axial end of each positionally-fixed, variable-vectoring flow control body is substantially equal to a degree of curvature of the downstream axial end of each structural support element.

5. The apparatus of claim 4, wherein an axial length of each positionally-fixed, variable-vectoring flow control body is less than an axial length of each structural support element.

6. The apparatus of claim 1, wherein a downstream axial end, with respect to the compressed air flow, of each structural support element comprises a respective positionally-fixed, variable-vectoring flow control functionality, such that the downstream axial ends of the plurality of structural support elements are configured to either (1) provide an electric potential to the compressed air flow to ionize the compressed air flow and to generate an electric field that exerts a force on the ionized compressed air flow, or (2) inject and/or remove air from the compressed air flow.

7. A turbine engine system comprising:
a fan section that directs a flow of air along an axial path into the turbine engine system;
a compressor section, axially downstream with respect to the flow of air from the fan section, that compresses the flow of air to generate a compressed air flow; and
a combustion section, axially downstream with respect to the compressed air flow from the compressor section, that combusts the compressed air flow,
wherein the compressor section comprises:
an annular outer structural casing;
an annular central hub disposed within the annular outer structural casing;
a plurality of structural support elements extending radially between the annular central hub and the annular outer structural casing; and
a plurality of positionally-fixed, variable-vectoring flow control bodies extending radially between the annular central hub and the annular outer structural casing and positioned circumferentially along the annular central hub, the plurality of positionally-fixed, variable-vectoring flow control bodies being interposed between the plurality of structural support elements,
wherein the plurality of positionally-fixed, variable-vectoring flow control bodies comprise either:
(1) plasma control bodies, wherein the plasma control bodies are configured to provide an electric potential to the compressed air flow to ionize the compressed air flow and to generate an electric field that exerts a force on the ionized compressed air flow, or
(2) fluidic control bodies, wherein the fluidic control bodies are configured to inject and/or remove air from the compressed air flow,
wherein two or more of the plurality of positionally-fixed, variable-vectoring flow control bodies are disposed between successive structural support elements of the plurality of structural support elements,
wherein a maximum circumferential width of each positionally-fixed, variable-vectoring flow control body is less than a maximum circumferential width of each structural support element,
wherein each structural support element has an oblong configuration and each positionally-fixed, variable-vectoring flow control body has a circular configuration, and
wherein the plurality of positionally-fixed, variable-vectoring flow control bodies are capable of actively directing the compressed air flow at variable but do not rotate, translate, or otherwise move with respect to the annular central hub to accomplish such variable-angle directing of the compressed air flow.

8. The turbine engine system of claim 7, wherein the compressor section comprises a low-pressure compressor and a high-pressure compressor axially downstream from the low-pressure compressor, with respect to the compressed air flow, and wherein the plurality of structural support elements and the plurality of positionally-fixed, variable-vectoring flow control bodies are positioned within the high-pressure compressor.

9. The turbine engine system of claim 8, wherein a downstream axial end, with respect to the compressed air flow, of each structural support element comprises a positionally-fixed, variable-vectoring flow control functionality, such that the downstream axial ends of the plurality of structural support elements are configured to either (1) provide an electric potential to the compressed air flow to ionize the compressed air flow and to generate an electric field that exerts a force on the ionized compressed air flow, or (2) inject and/or remove air from the compressed air flow.

10. The turbine engine system of claim 9, wherein a location of the maximum circumferential width of each structural support element is positioned axially upstream, with respect to the compressed air flow, from a location of the maximum circumferential width of each positionally-fixed, variable-vectoring flow control body.

* * * * *